United States Patent [19]
Freund

[11] Patent Number: 5,502,377
[45] Date of Patent: Mar. 26, 1996

[54] METHOD AND APPARATUS FOR MEASURING ROTARY MOVEMENT OF A SHAFT

[75] Inventor: Michael N. Freund, Schorndorf, Germany

[73] Assignee: Eastman Kodak Company, Rochester, N.Y.

[21] Appl. No.: 350,595

[22] Filed: Dec. 7, 1994

[30] Foreign Application Priority Data

Dec. 24, 1993 [DE] Germany .................. 43 44 494.6

[51] Int. Cl.⁶ .............................. G01P 3/36; G01P 3/48
[52] U.S. Cl. ................................... 324/175; 324/172
[58] Field of Search ..................... 324/172, 166, 324/173, 175, 207.25, 207.24; 250/231.13, 231.14, 231.15, 231.16, 231.17, 231.18

[56] References Cited

U.S. PATENT DOCUMENTS

| | | | |
|---|---|---|---|
| 2,782,626 | 2/1957 | Jochum et al. | 324/172 X |
| 2,993,161 | 7/1961 | Steele | 324/172 X |
| 3,312,861 | 4/1967 | Mauch | 324/172 X |
| 4,580,047 | 4/1986 | Sasaki et al. | 324/173 |
| 4,904,937 | 2/1990 | Takahashi et al. | 324/207.25 |
| 4,952,874 | 8/1990 | Stadtfeld | 324/207.25 |
| 5,257,255 | 10/1993 | Morimoto et al. | 324/173 |

FOREIGN PATENT DOCUMENTS

| | | | |
|---|---|---|---|
| 0048983 | 5/1986 | European Pat. Off. | G01D 5/16 |
| 0474362 | 3/1992 | European Pat. Off. | G01P 3/44 |
| 3115670 | 11/1982 | Germany | H04N 5/782 |
| 758176 | 8/1980 | U.S.S.R. | |
| 1498829 | 1/1978 | United Kingdom | G01B 7/30 |

*Primary Examiner*—Sandra L. O'Shea
*Assistant Examiner*—Roger Phillips
*Attorney, Agent, or Firm*—Milton S. Sales

[57] ABSTRACT

The invention relates to a method and apparatus for measuring the rotary movement of a shaft, wherein according to said method a magnetic pattern radially applied to a magnetic disk is inductively scanned so that in a magnetic head voltage pulses are generated which are associated with the magnetic pattern and used for determining the rotary movement and the angular position of a rotating object. To realize a measuring arrangement featuring a selectable measuring resolution, by means of a read/write head at least one magnetic pattern is radially applied with a randomly selectable recording density to the magnetic disk connected to the shaft to be measured, said pattern being then inductively scanned at a constant rotational speed of the read/write head as the magnetic disk is at rest. From the induced voltage pulses the read/write head speed is computed by electronic means and stored. Another inductive scanning during rotation of the magnetic disk at the read/write head speed previously used permits the rotational speed of the shaft and the angle of rotation to be determined by electonic means from the superposition of both voltage pulses induced in the read/write head.

5 Claims, 1 Drawing Sheet

METHOD AND APPARATUS FOR MEASURING ROTARY MOVEMENT OF A SHAFT

BACKGROUND OF THE INVENTION

1. Technical Field

The invention relates to a method and apparatus for measuring the rotary movement of a shaft, wherein according to said method voltage pulses are generated in a detecting head by inductively scanning a magnetic pattern radially applied to a magnetic disk, the voltage pulses being associated with said magnetic pattern and used for determining the rotary movement of a shaft.

2. Background Art

An apparatus of the generic type is known, for example, from EP 0 048 983 in which for determining rotational speed and phase angle of rotating bodies a detector means is used consisting of a magnetic recording medium attached to the body to be measured and having circular tracks provided with N and S magnet poles. Said tracks may also be formed as thin layers as disclosed in EP 0 048 983. For detecting either rigidly mounted coils or magnetic resistor elements are used which are arranged in a reference position invariable relative to the track.

From EP 0 474 362, a speedometer which is known for determining the angular velocity of a rotating object is provided with two encoders stationarily arranged about the shaft of the rotating object to be measured and generating pulses of different resolution according to the rotation of the shaft.

SU-PS 758176 discloses a controlled delay unit with which stable pulses having a fixed frequency were applied to a magnetic disk which is scanned and the signals are converted into a correspondingly proportional voltage. In this way, speed deviations can be detected and used for controlling the disk-to-playback head distance along a guide.

DE-OS 31 15 670 discloses a method for determining the angular position of magnetic heads relative to a recording tape. In addition to the magnetic heads, a head wheel has two rotating permanent magnets which during rotation generate pulses of changing polarity in a stationary coil arranged adjacent to the head. The pulses are used for determining the respective position and speed of the head wheel disk.

The above mentioned apparatus have a disadvantage in that the measuring accuracy for determining the rotational speed or angular position of the rotating part is, due to their construction, predetermined and cannot be altered. On the one hand, for a highly precise speed determination thus a lot of instruments are required, such as in the case of EP 0 474 362, on the other hand, such a sophisticated instrumentation is not necessary for measurements requiring lower resolution.

DISCLOSURE OF THE INVENTION

It is the object of the invention to provide a method and apparatus of the generic type which in a simple manner allows determination of the rotational speed and angular position of a rotating object and permits a selection of the measuring resolution.

According to the invention, the above object is attained in that by means of a read/write head at least one magnetic pattern is radially applied with a substantially freely determinable recording density to a magnetic disk connected to a shaft to be measured, said pattern then being inductively scanned at a constant rotational speed of the read/write head as the magnetic disk is at rest. The rotational speed of the head is then computed by electronic means from the voltage pulses induced in the read/write head. Subsequently, the magnetic pattern is inductively scanned during rotation of the magnetic disk, at the previously used constant read/write head speed, the rotational speed of the shaft and the angle of rotation being determined by electronic means from the superposition of the induced voltage pulses.

Speed variations of the magnetic disk resulting from non-uniform rotational movement of the shaft to be measured are thus directly proportional to the pulse frequency variation. Varying the information densities of the magnetic pattern permits in a simple manner changing the measuring resolution and thus an adaptation to different measuring requirements.

According to another aspect of the method, a plurality of magnetic patterns having different information densities are radially applied to the magnetic disk by means of read/write heads associated with the patterns, so that various measuring resolutions can be realized advantageously eliminating the need for applying a new magnetic pattern.

The method is carried out by means of a programmable encoder having a magnetic disk provided with a plurality of concentric magnetic tracks and connected to the shaft to be measured by means of a clutch. For inductively scanning the magnetic pattern each magnetic track of the magnetic disk is associated with a read/write head at a fixed distance. The heads are driven by means of a motor via a common shaft on which an encoder is arranged for determining the rotational speed.

Further advantages of the invention will be apparent from the subclaims and from an embodiment of the invention described with respect to the drawing.

BEST MODE FOR CARRYING OUT THE INVENTION

Figure 1:
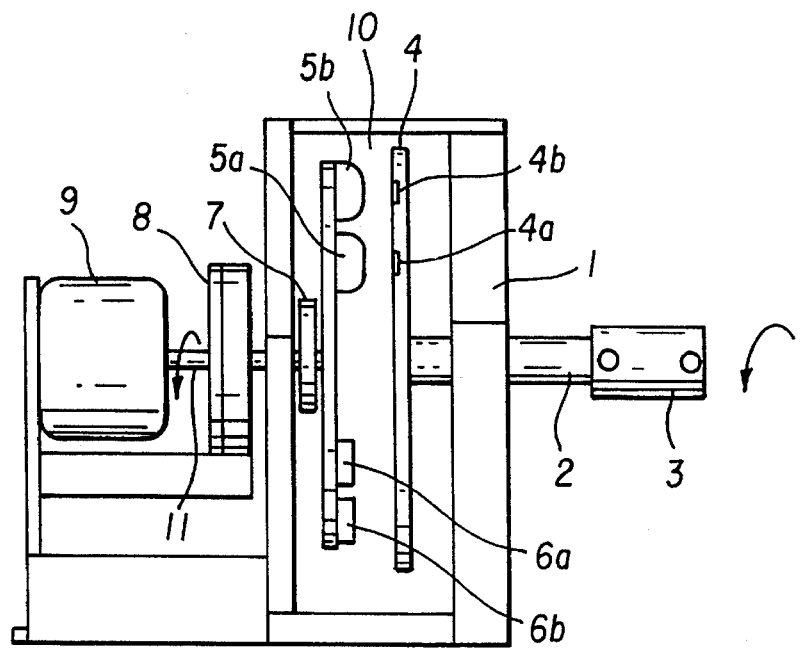
FIG. 1 schematically shows an encoder for carrying out the method according to the invention.
Figure 2:
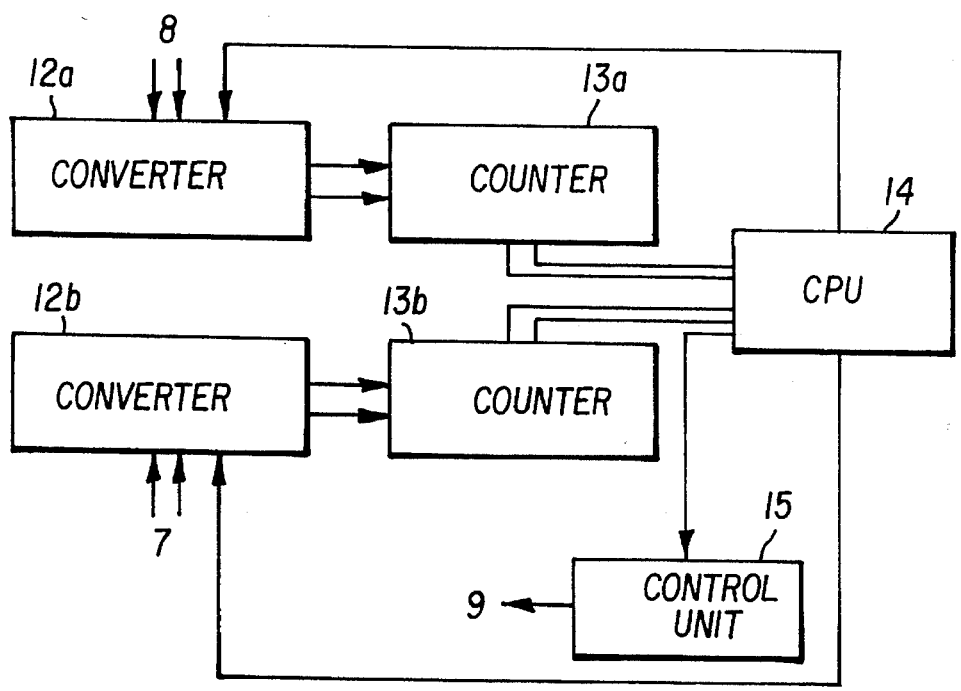
FIG. 2 shows the signal flow of the signals generated by the encoder.

The encoder shown in FIG. 1 for carrying out the method is formed of a housing 1 in the interior of which a thin magnetic disk 4 provided with magnetic tracks 4a and 4b is mounted to a shaft 2 connected to the shaft to be measured by means of a clutch 3. At a defined distance 10, the magnetic tracks 4a and 4b of disk 4 are each associated with a read/write head 5a and 5b for applying and detecting a magnetic pattern. Compensating masses 6a and 6b are provided to guarantee truth of rotation of the retaining plate holding the read/write heads 5a and 5b.

A shaft 11 extending into the housing 1 is driven by a motor 9. Shaft 11 carries an optical encoder 8 for speed measurement of the read/write heads. Encoder 8 includes an optical pattern which in a known manner is scanned by means of optical transmitter and receiver elements, the scanning signals being fed to a central processing unit 14 via a square-wave converter 12a and counter 13a for evaluation. A commutator 7 arranged on shaft 11 is used for transmitting the voltage pulses induced in the read/write heads 5a and 5b to a square-wave converter 12b and then via a counter 13b to said central processing unit 14.

The method according to the invention is described in the following:

During rotational movement, magnetic patterns are applied to one or both of the magnetic tracks 4a and 4b of the magnetic disk 4 by means of the read/write heads 5a and 5b. The patterns have different information densities which are restricted substantially by the material properties of the magnetic disk 4. The pulse frequency of the voltage signals for applying the magnetic patterns in tracks 4a and 4b, and thus their information density, is predetermined by the CPU 14 and transmitted to the read/write heads 5a and 5b. Subsequent to magnetization, the servomotor 9 sets the head supporting disk together with the read/write heads 5a and 5b arranged thereon in a predetermined constant rotary motion controlled by the motor voltage and detected by the optical encoder 8. Thus, when the magnetic disk 4 is at rest, voltage pulses are induced in the read/write heads 5a and 5b according to the information density of the magnetic patterns in tracks 4a and 4b. The pulse voltages obtained via commutator 7 are converted by the square-wave converter 12b into TTL square pulses counted by counter 13b. These signals as well as the signals generated analogously by the optical encoder 8, the square-wave converter 12a and the counter 13a are fed to the CPU 14 and compared with a threshold value corresponding to a predetermined speed of the read/write heads 5a and 5b. If there is a difference between the actual speed value and the nominal speed value, the CPU 14 generates an actuating signal which via an automatic control unit 15 varies the motor voltage of servomotor 9 accordingly. In order to support stabilization of the speed, the head supporting disk carrying the read/write heads 5a and 5b features a high inertia.

To determine the rotational speed of the shaft and the angle of rotation, the object to be measured is connected to the encoder via clutch 3 and put into motion. This induces an additional voltage in the read/write heads 5a and 5b which superimposes the one described and is fed to the CPU 14 via commutator 7, converter 12a and counter 13a. Through the information densities of the magnetic patterns the pulse frequency is thus directly proportional to the speed which can be indicated visually if desired. The angle of rotation can be computed in a known manner by means of the counters 13a, 13b and the CPU 14 from the number of pulses per 360 angular degrees predetermined by the magnetic disk 4 and the encoder 8.

The evaluation of several magnetic patterns having different information densities thus permits a selection of the measuring resolution adapted to any individual measuring problem. For detecting the direction of rotation of the shaft there is a possibility of using one of the magnetic tracks 4a or 4b as an evaluation track with a coding phase-shifted asymmetrically relative to the scanning track.

The invention has been described in detail with particular reference to preferred embodiments thereof, but it will be understood that variations and modifications can be effected within the spirit and scope of the invention.

What is claimed is:

1. A programmable apparatus for measuring a rotary movement of a shaft, said apparatus comprising:

a magnetic disk provided with a plurality of concentric magnetic tracks upon which has been provided an inductively scanable magnetic pattern;

a plurality of magnetic read heads, each read head being positioned to scan the magnetic patterns on a respective magnetic track at a fixed distance, such that voltage pulses generated by the magnetic read heads are characteristic of the rotational speed of the shaft to be measured;

a clutch connecting the disk to the shaft to be measured;

a motor drivingly connected to a common shaft;

means drivingly coupling the read heads to the common shaft; and an encoder on the common shaft and adapted to determine the rotational speed of the common shaft.

2. A programmable apparatus as set forth in claim 1 wherein the encoder is an optical encoder.

3. A method for measuring the rotary movement of a shaft, said method comprising the steps of:

radially applying at least one magnetic pattern of randomly selectable recording density to a magnetic disk connected to the shaft to be measured;

inductively scanning the magnetic pattern at a constant rotational speed of a magnetic head as the magnetic disk is at rest to produce a first set of voltage pulses;

computing the rotational speed of the magnetic head from the induced voltage pulses;

storing the computed speed of the magnetic head;

subsequently inductively scanning the magnetic pattern during rotation of the magnetic disk at the previously-used constant rotational speed of the magnetic head to produce a second set of voltage pulses; and computing the rotary movement by means of a comparison of the first and second sets of voltage pulses induced in the magnetic head.

4. A method for measuring the rotary movement of a shaft as set forth in claim 3, wherein the step of computing the rotary movement provides the rotational speed of the shaft and its angle of rotation.

5. A method for measuring the rotary movement of a shaft as set forth in claim 3, wherein the applying step includes radially applying a plurality of magnetic patterns having different densities to the magnetic disk.

\* \* \* \* \*